US012693073B2

(12) United States Patent
Yan et al.

(10) Patent No.: US 12,693,073 B2
(45) Date of Patent: Jul. 28, 2026

(54) DRYING SYSTEM

(71) Applicant: CONTEMPORARY AMPEREX TECHNOLOGY (HONG KONG) LIMITED, Hong Kong (CN)

(72) Inventors: Haohao Yan, Ningde (CN); Jiancheng Cai, Ningde (CN); Ganyu Xu, Ningde (CN); Haohua Yu, Ningde (CN); Guangsheng Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 434 days.

(21) Appl. No.: 18/534,763

(22) Filed: Dec. 11, 2023

(65) Prior Publication Data

US 2024/0318911 A1 Sep. 26, 2024

Related U.S. Application Data

(63) Continuation of application No. PCT/CN2023/099426, filed on Jun. 9, 2023.

(30) Foreign Application Priority Data

Mar. 22, 2023 (CN) ......................... 202320568034.5

(51) Int. Cl.
*F26B 21/25* (2026.01)
*F26B 3/12* (2006.01)
*F26B 25/14* (2006.01)

(52) U.S. Cl.
CPC ................ *F26B 21/25* (2026.01); *F26B 3/12* (2013.01); *F26B 25/14* (2013.01)

(58) Field of Classification Search
CPC ............. F26B 21/25; F26B 3/12; F26B 25/14
(Continued)

(56) References Cited

U.S. PATENT DOCUMENTS 5,671,544 A * 9/1997 Yokomizo ........... H10P 72/0408 34/169
5,799,412 A * 9/1998 Yamamoto .............. F26B 21/40 34/582
(Continued)

FOREIGN PATENT DOCUMENTS

CN 102607247 A 7/2012
CN 206285515 U 6/2017
(Continued)

OTHER PUBLICATIONS

Office Action issued May 26, 2025 in Korean Patent Application No. 10-2023-7037496 with English translation thereof.
(Continued)

*Primary Examiner* — Stephen M Gravini
(74) *Attorney, Agent, or Firm* — XSENSUS LLP

(57) ABSTRACT

A drying system includes a drying chamber, a collecting apparatus, and an air feed apparatus. The drying chamber is configured to accommodate a material to be dried. The collecting apparatus is connected to a material outlet of the drying chamber. The air feed apparatus is connected to an air inlet of the drying chamber and is configured to feed air to the drying chamber. The air feed apparatus includes a first condensing mechanism, a first heating mechanism, and a first water content sensor, where along an air feed direction of the air feed apparatus, the first condensing mechanism is located upstream of the first heating mechanism; the first condensing mechanism is configured to reduce water content of gas entering the drying chamber; and the first heating mechanism is configured to heat the gas entering the drying chamber.

14 Claims, 3 Drawing Sheets

(58) Field of Classification Search
USPC ............................................................. 34/569
See application file for complete search history.

(56) References Cited

U.S. PATENT DOCUMENTS

| | | | | | |
|---|---|---|---|---|---|
| 5,950,328 | A * | 9/1999 | Ichiko | H10P 72/0408 34/364 |
| 6,032,382 | A * | 3/2000 | Matsumoto | H10P 70/15 257/E21.228 |
| 7,380,348 | B2 * | 6/2008 | Seebach | F26B 17/105 34/594 |
| 7,484,315 | B2 * | 2/2009 | Suzuki | C23C 16/4481 261/23.1 |
| 9,976,804 | B2 * | 5/2018 | Hanawa | B01D 53/263 |
| 11,788,791 | B2 * | 10/2023 | Zhang | F25B 6/04 34/90 |
| 11,885,563 | B2 * | 1/2024 | Chudnovsky | D06F 58/26 |
| 12,130,083 | B1 * | 10/2024 | Goldberg | F26B 3/12 |
| 12,379,156 | B2 * | 8/2025 | Bos | F26B 3/10 |
| 12,590,259 | B1 * | 3/2026 | Merrill | C10L 5/363 |
| 2022/0062841 | A1 | 3/2022 | Szczap et al. | |
| 2024/0282909 | A1 * | 8/2024 | Higashio | F26B 13/002 |
| 2024/0318911 | A1 * | 9/2024 | Yan | F26B 3/12 |
| 2024/0426551 | A1 * | 12/2024 | Bellemo | F26B 23/001 |
| 2025/0239586 | A1 * | 7/2025 | Seidl | F26B 13/10 |

FOREIGN PATENT DOCUMENTS

| | | | | |
|---|---|---|---|---|
| CN | 108955217 A | | 12/2018 | |
| CN | 109173560 A | | 1/2019 | |
| CN | 214680070 U | | 11/2021 | |
| CN | 118215814 A | * | 6/2024 | F26B 21/30 |
| EP | 4459211 A1 | * | 11/2024 | F26B 21/25 |
| JP | H03181782 A | | 8/1991 | |
| JP | 2012-052786 A | | 3/2012 | |
| JP | 2025513121 A | * | 4/2025 | F26B 21/25 |
| KR | 20110021534 A | | 3/2011 | |
| KR | 101236381 B1 | | 2/2013 | |
| KR | 20180089818 A | | 8/2018 | |
| KR | 20240143794 A | * | 10/2024 | F26B 21/25 |
| WO | 2012/045552 A1 | | 4/2012 | |

OTHER PUBLICATIONS

Extended European Search Report issued Nov. 21, 2024 in European Patent Application No. 23858398.3.
Notice of Grant of Utility Model Patent Rights issued Apr. 3, 2023 in Chinese Utility Model Patent Application No. 202320568034.5 and machine English translation thereof.
International Search Report issued Dec. 15, 2023 in International Patent Application No. PCT/CN2023/099426 and machine English translation thereof.
Written Opinion issued Dec. 15, 2023 in International Patent Application No. PCT/CN2023/099426 and machine English translation thereof.
Decision to Grant a Patent mailed Oct. 28, 2025, in Japanese Application No. 2023-567865, 5 pages including English translation.

* cited by examiner

DRYING SYSTEM

CROSS-REFERENCE TO RELATED APPLICATIONS

This application is a Continuation of International Application No. PCT/CN2023/099426, filed on Jun. 9, 2023, which claims priority to Chinese patent application No. 202320568034.5, filed on Mar. 22, 2023 and entitled "DRYING SYSTEM", each of which is incorporated herein by reference in its entirety.

TECHNICAL FIELD

This application relates to the field of battery technologies, and in particular, to a drying system.

BACKGROUND

Energy saving and emission reduction are crucial to the sustainable development of the automobile industry. Electric vehicles, with their advantages in energy conservation and emission reduction, have become an important part of sustainable development of the automobile industry. For electric vehicles, battery technology is an important factor in connection with their development.

In the development of battery technologies, how reliability of batteries is improved is an urgent technical problem to be solved in the battery technologies.

SUMMARY

This application provides a drying system, which can improve reliability of batteries.

This application is implemented using the following technical solutions.

This application provides a drying system including a drying chamber, a collecting apparatus, and an air feed apparatus. The drying chamber is configured to accommodate a material to be dried. The collecting apparatus is connected to a material outlet of the drying chamber. The air feed apparatus is connected to an air inlet of the drying chamber and is configured to feed air to the drying chamber. The air feed apparatus includes a first condensing mechanism, a first heating mechanism, and a first water content sensor. Along an air feed direction of the air feed apparatus, the first condensing mechanism is located upstream of the first heating mechanism. The first condensing mechanism is configured to reduce water content of gas entering the drying chamber. The first heating mechanism is configured to heat the gas entering the drying chamber. The first water content sensor is disposed between the first condensing mechanism and the first heating mechanism, and is configured to detect water content of gas discharged from the first condensing mechanism and generate a water content signal.

In the foregoing solution, the air feed apparatus includes a first condensing mechanism and a first heating mechanism. The first condensing mechanism condenses the gas to reduce its water content, and then the first heating mechanism raises the temperature of the condensed gas, so that the high-temperature gas with low water content enters the drying chamber to effectively dry the material. On the one hand, provision of the first condensing mechanism can meet the material drying requirement, resulting in lower water content and improved quality of the material. On the other hand, reducing the water content of the gas entering the drying chamber enhances the drying effect of the material. As compared to increasing the drying temperature to improve the drying effect of the material, this approach can effectively reduce the risk of compromising the quality of the material due to its physical properties changed by high temperatures. In addition, the first water content sensor is disposed between the first condensing mechanism and the first heating mechanism to detect the water content of the gas discharged from the first condensing mechanism and generate a water content signal, so that the water content of the gas fed to the drying chamber by the air feed apparatus can be known, allowing the operator or the control apparatus to regulate the power of the first condensing mechanism based on the water content signal. On the one hand, if the water content is excessively high, that is, does not meet the requirement, the power of the first condensing mechanism can be increased to achieve the desired water content. On the other hand, if the water content is excessively low, the power of the first condensing mechanism can be reduced to save energy and control costs. In some embodiments, the material may be an adhesive used in batteries, and the adhesive may be a material that bonds the active substance layer and the current collector together. Therefore, using the drying system provided in some embodiments of this application to dry the adhesive can make the water content of the adhesive meet the requirement and improve connection stability between the active substance layer and the current collector, thus achieving high reliability of the battery.

According to some embodiments of this application, the drying system further includes a control apparatus, where the control apparatus is connected to the first water content sensor and the first condensing mechanism, the control apparatus is configured to receive the water content signal and control power of the first condensing mechanism based on the water content signal such that the water content P of the gas discharged by the first condensing mechanism satisfies $P \leq 10$ mg/m$^3$.

In the foregoing solution, the control apparatus is disposed to automatically control the power of the first condensing mechanism based on the water content signal such that the water content P of the gas discharged by the first condensing mechanism satisfies $P \leq 10$ mg/m$^3$. In this way, the material in the drying chamber is dried by gas with lower water content, thus improving quality of the material and achieving high reliability of the battery.

According to some embodiments of this application, an air feed rate of the air feed apparatus is M1, satisfying 10000 m$^3$/h$\leq$M1$\leq$60000 m$^3$/h.

In the foregoing solution, in some embodiments, if the air feed rate of the air feed apparatus is excessively low, the drying effect on the material becomes poor, and if the air feed rate of the air feed apparatus is excessively high, more energy is required for air supply, resulting in higher costs. To address this, in these embodiments, the air feed rate M1 of the air feed apparatus is limited to 10000 m$^3$/h to 60000 m$^3$/h. On the one hand, this limitation can enhance the drying effect on the material and improve its quality, thus improving reliability of the battery. On the other hand, this limitation can effectively control costs.

According to some embodiments of this application, the air feed apparatus further includes a first filter and a second filter. Along the air feed direction, the first filter is located upstream of the first condensing mechanism, and the second filter is located downstream of the first heating mechanism and located between the air inlet of the drying chamber and the first heating mechanism.

In the foregoing solution, the first filter is disposed upstream of the first condensing mechanism to effectively filter out the impurities in the gas, thus reducing the effect of the impurities in the gas on the first condensing mechanism and the first heating mechanism, and prolonging the service life of the first condensing mechanism and the first heating mechanism. The second filter is disposed between the drying chamber and the first heating mechanism to further reduce the impurities in the gas, so as to reduce the effect of the impurities on the material. This allows the material in good quality, thus achieving high quality of the battery.

According to some embodiments of this application, the drying system further includes an air compensation apparatus, where the air compensation apparatus is disposed between the drying chamber and the collecting apparatus and is configured to supply air to the collection collecting apparatus.

In the foregoing solution, the air compensation apparatus is disposed to supply air to the collecting apparatus, facilitating use of the gas supplied by the air compensation apparatus for re-drying the material. This ensures that the water content of the material meets the requirement, and improves quality of the material, thus achieving high reliability of the battery.

According to some embodiments of this application, an air supply rate of the air compensation apparatus is M2, satisfying 5000 $m^3/h \leq M2 \leq 20000\ m^3/h$.

In the foregoing solution, in some embodiments, if the air supply rate of the air compensation apparatus is excessively low, the drying effect on the material becomes poor, and if the air supply rate of the air compensation apparatus is excessively high, more energy is required for air supply, resulting in higher costs. In view of this, in these embodiments, the air supply rate M2 of the air compensation apparatus is limited to 5000 $m^3/h$ to 20000 $m^3/h$. On the one hand, this limitation can enhance the drying effect on the material and improve its quality, thus improving reliability of the battery. On the other hand, this limitation can effectively control costs.

According to some embodiments of this application, the air compensation apparatus includes a second heating mechanism, where the second heating mechanism is configured to heat gas supplied to the collecting apparatus.

In the foregoing solution, the second heating mechanism is disposed, making it possible for the gas with a certain amount of heat to dry the material in the collecting apparatus. This can improve the drying effect on the material and enhance the quality of the material, thus improving the reliability of the battery.

According to some embodiments of this application, the drying system further includes a first temperature sensor, where the first temperature sensor is disposed in the drying chamber, and is configured to detect temperature in the drying chamber and generate a temperature signal.

In the process of drying the material, the temperature cannot be excessively high or low. If the temperature is excessively high, there is a risk of affecting properties of the material, for example, causing the material adhesion or swelling. If the temperature is excessively low, the drying effect is compromised. Therefore, in the foregoing solution, the first temperature sensor is disposed to detect the current temperature in the drying chamber and generate a temperature signal, so that the temperature of the material can be timely known and the power of the second heating mechanism can be regulated based on the requirements, preventing the temperature from being excessively high or low. This ensures good drying effect on the material, thus improving reliability of the battery.

According to some embodiments of this application, the drying system further includes a control apparatus, where the control apparatus is connected to the first temperature sensor and the second heating mechanism, and the control apparatus is configured to receive the temperature signal and control power of the second heating mechanism based on the temperature signal such that a heating temperature T of the gas heated by the second heating mechanism satisfies 40° C.$\leq$T$\leq$60° C.

In the foregoing solution, the control apparatus is disposed to automatically control the power of the second heating mechanism based on the temperature signal such that the heating temperature T of the gas heated by the second heating mechanism satisfies 40° C.$\leq$T$\leq$60° C., thereby facilitating drying of the material within an appropriate temperature range.

According to some embodiments of this application, the air compensation apparatus includes a second condensing mechanism, where along an air supply direction of the air compensation apparatus, the second condensing mechanism is located upstream of the second heating mechanism, and the second condensing mechanism is configured to reduce water content of gas supplied to the collecting apparatus.

In the foregoing solution, the second condensing mechanism is disposed to reduce the water content of the gas supplied to the collecting apparatus, leading to good drying effect on the material and improved quality of the material, thus achieving high reliability of the battery.

According to some embodiments of this application, the air compensation apparatus further includes a third filter and a fourth filter. Along the air supply direction, the third filter is located upstream of the second condensing mechanism, and the fourth filter is located downstream of the second heating mechanism and located between the collecting apparatus and the second heating mechanism.

In the foregoing solution, the third filter is disposed upstream of the second condensing mechanism to effectively filter out the impurities in the gas, thus reducing the effect of the impurities in the gas on the second condensing mechanism and the second heating mechanism, and prolonging the service life of the second condensing mechanism and the second heating mechanism. The fourth filter is disposed between the collecting apparatus and the second heating mechanism to further reduce the impurities in the gas, so as to reduce the effect of the impurities on the material. This allows the material in good quality, thus achieving high quality of the battery.

According to some embodiments of this application, the drying system further includes a material conveying apparatus, where the material conveying apparatus is connected to a material inlet of the drying chamber to provide the material to be dried to the drying chamber.

In the foregoing solution, the material conveying apparatus is disposed to supply a material to the drying chamber, implementing automation of the drying system. This not only reduces labor costs but also improves drying efficiency.

According to some embodiments of this application, the drying chamber is provided with a nozzle inside, where the nozzle is connected to the material inlet of the drying chamber.

In the foregoing solution, when the material enters the drying chamber through the material inlet, the material can be atomized under the action of the nozzle. This increases the contact area between the material and the high-temperature gas, thereby improving the drying efficiency.

According to some embodiments of this application, the collecting apparatus includes a cyclone collector and/or a baghouse collector.

In the foregoing solution, the collecting apparatus includes a cyclone collector and/or a baghouse collector, which can effectively separate the gas from the material, thereby improving the collecting efficiency of the material.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions of the embodiments of this application more clearly, the following briefly describes the accompanying drawings required for describing the embodiments. It is appreciated that the accompanying drawings below show merely some embodiments of this application and thus should not be considered as limitations on the scope. Persons of ordinary skill in the art may still derive other related drawings from the accompanying drawings without creative efforts.

REFERENCE SIGNS

Figure 1:
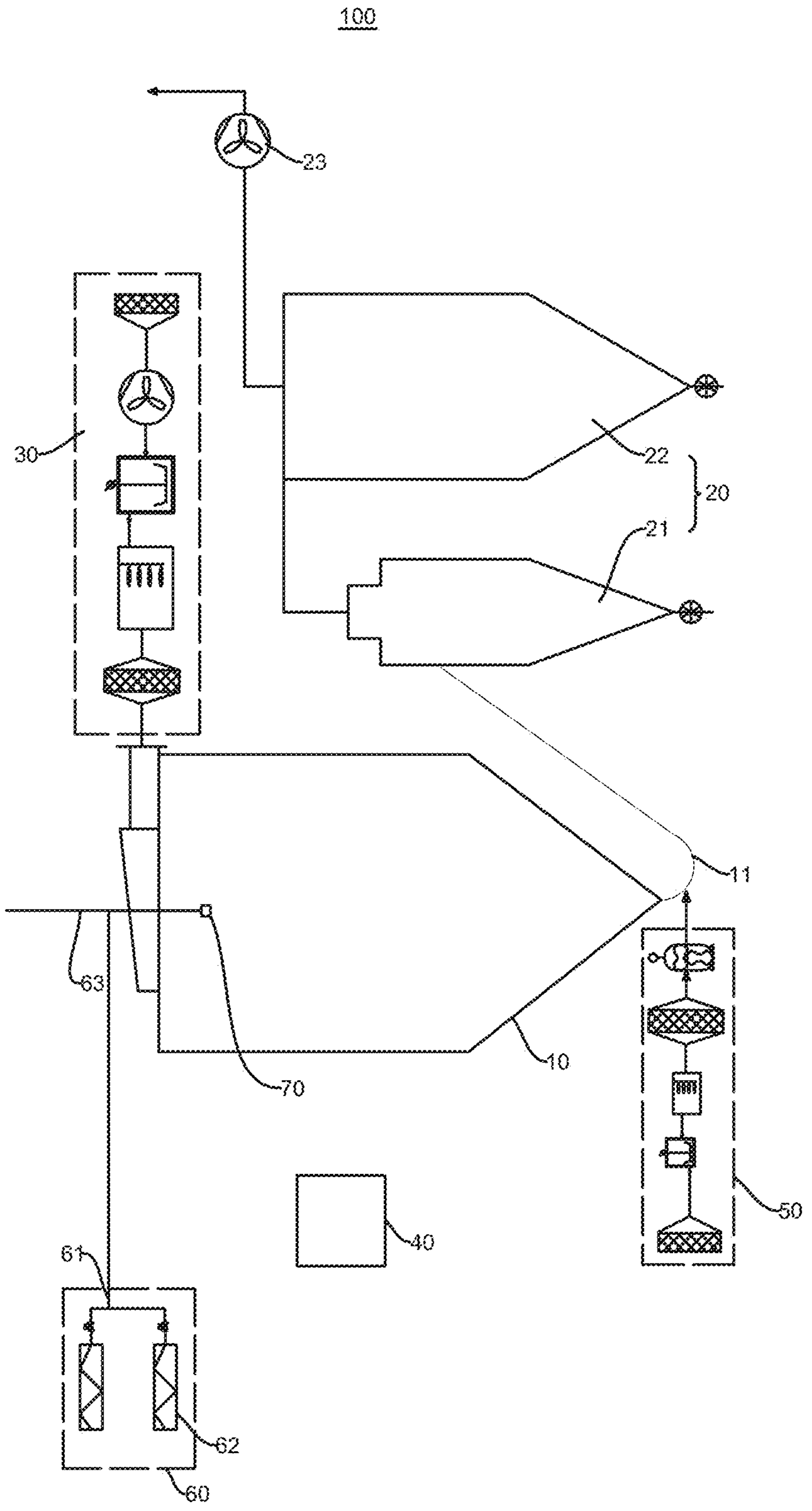
FIG. 1 is a schematic diagram of a drying system according to some embodiment of this application.

100—drying system; 10—drying chamber; 11—second pipe; 20—collecting apparatus; 21—cyclone collector; 22—baghouse collector; 23—draft fan; 30—air feed apparatus; 31—first condensing mechanism; 32—first heating mechanism; 33—first fan; 34—first water content sensor; 35—first filter; 36—second filter; 37—first pipe; 40—control apparatus; 50—air compensation apparatus; 51—second heating mechanism; 52—second condensing mechanism; 53—third filter; 54—fourth filter; 55—second fan; 56—third pipe; 60—material conveying apparatus; 61—fourth pipe; 62—conveying pump; 63—high pressure pipe; 70—nozzle; x—air feed direction; y—air supply direction.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. Persons of ordinary skills in the art can understand specific meanings of these terms in this application as appropriate to specific situations.

The term "and/or" in this application is only an associative relationship for describing associated objects, indicating that three relationships may be present. For example, A and/or B may indicate three cases: presence of A; presence of both A and B; and presence of B. In addition, the character "/" in this application generally indicates an "or" relationship between contextually associated objects.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

In this application. "a plurality of" means more than two (inclusive).

In this application, the battery may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application.

The core component of the battery that can achieve repeated charging and discharging function is an electrode assembly in the battery cell. The electrode assembly includes electrode plates and a separator, and the electrode plates include a positive electrode plate and a negative electrode plate. The separator is generally disposed between the positive electrode plate and the negative electrode plate to achieve mutual insulation between the positive electrode plate and the negative electrode plate. The separator may be made of PP (polypropylene, polypropylene), PE (polyethylene, polyethylene), or the like. Working of the battery cell mainly relies on migration of metal ions between the positive electrode plate and the negative electrode plate. The electrode plate includes a current collector and an active substance layer. Along a width direction of the electrode plate, the current collector has a coated zone coated with the active substance layer and an uncoated zone not coated with the active substance layer. A tab is made by cutting on the current collector not coated with the active substance layer, and the tab implements charging and discharging of the electrode assembly. The current collector may be a metal foil such as a copper foil and an aluminum foil. In some embodiments, the active substance layer is disposed on surface of the current collector via an adhesive. During a manufacture process of the adhesive, the adhesive is dried via the drying system.

In the development of battery technologies, how reliability of batteries is improved is an urgent technical problem to be solved in the battery technologies. In a battery, the active substance layer is disposed on the surface of the current collector via the adhesive, so quality of the adhesive affects reliability of the battery. Factors that affect the quality of the adhesive include the water content of the adhesive. However, the current drying system has poor drying effect, and an adhesive dried by such drying system has an excessively high water content, that is, does not meet requirements. This affects the adhesion stability between the active substance layer and the current collector, leading to low reliability of the battery.

In view of this, in order to solve the problem of low reliability of the battery caused by poor drying effect of the drying system and excessively high water content of the adhesive, a drying system is designed according to some embodiments of this application, where the drying system includes a drying chamber, a collecting apparatus, and an air feed apparatus. The drying chamber is configured to accommodate an adhesive to be dried. The collecting apparatus is connected to a material outlet of the drying chamber. The air feed apparatus is connected to an air inlet of the drying chamber and is configured to feed air to the drying chamber. The air feed apparatus includes a first condensing mechanism and a first heating mechanism. Along an air feed direction of the air feed apparatus, the first condensing mechanism is located upstream of the first heating mechanism. The first condensing mechanism is configured to reduce water content of gas entering the drying chamber, and the first heating mechanism is configured to heat the gas entering the drying chamber.

In the foregoing solution, the water content in the gas is reduced using the first condensing mechanism, and then the dried gas is heated using the first heating mechanism, so that the high-temperature gas with lower water content effectively dries the adhesive in the drying chamber to effectively reduce the water content of the adhesive and improve the quality of the adhesive, thereby improving the adhesion stability between the active substance layer and the current collector and achieving high reliability of the battery.

Materials to be dried using the drying system disclosed in this embodiment of this application include but are not limited to the adhesive needed for batteries, and may also be materials not in batteries. The material to be dried using the drying system provided in this embodiment of this application being an adhesive required in the battery is as an example for description.

Figure 2:
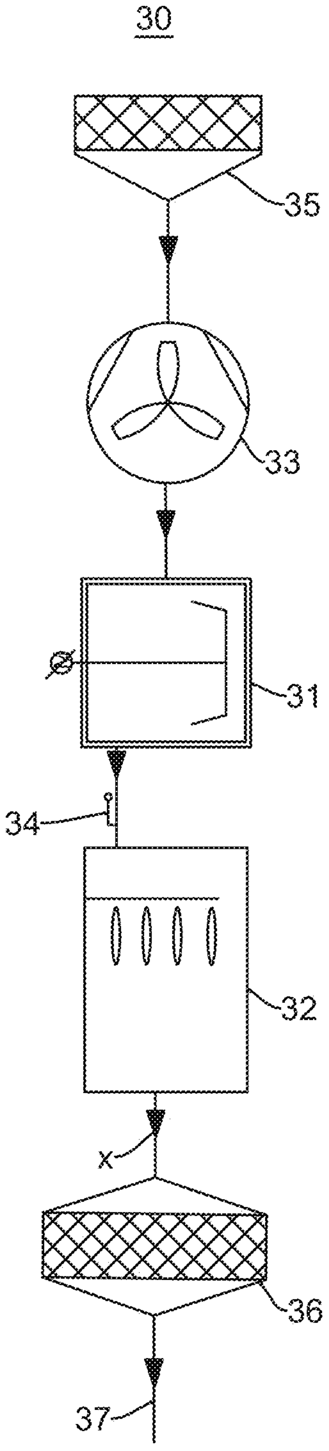
FIG. 2 is a schematic diagram of an air feed apparatus according to some embodiment of this application.

According to some embodiments of this application, referring to FIG. 1 and FIG. 2, FIG. 1 is a schematic diagram of a drying system 100 according to some embodiment of this application, and FIG. 2 is a schematic diagram of an air feed apparatus 30 according to some embodiment of this application.

The drying system 100 includes a drying chamber 10, a collecting apparatus 20, and an air feed apparatus 30. The drying chamber 10 is configured to accommodate a material to be dried. The collecting apparatus 20 is connected to a material outlet of the drying chamber 10. The air feed apparatus 30 is connected to an air inlet of the drying chamber 10 and is configured to feed air to the drying chamber 10. The air feed apparatus 30 includes a first condensing mechanism 31, a first heating mechanism 32, and a first water content sensor 34. Along an air feed direction x of the air feed apparatus 30, the first condensing mechanism 31 is located upstream of the first heating mechanism 32. The first condensing mechanism 31 is configured to reduce water content of gas entering the drying chamber 10, and the first heating mechanism 32 is configured to heat the gas entering the drying chamber 10. The first water content sensor 34 is disposed between the first condensing mechanism 31 and the first heating mechanism 32, and is configured to detect water content of gas discharged from the first condensing mechanism 31 and generate a water content signal.

The drying chamber 10 is a member used for accommodating a material to be dried, and generally has a material inlet, a material outlet, and an air inlet. The material is put into the drying chamber 10 through the material inlet, high-temperature gas enters the drying chamber 10 through the air inlet to interact with the material, and the material dried via the high-temperature gas is discharged through the material outlet. In some embodiments, the drying chamber 10 may be called a main tower by technicians.

The collecting apparatus 20 is a member connecting to the material outlet of the drying chamber 10 and is configured to collect the dried material. In some embodiments, the gas having interacted with the material in the drying chamber 10 may also be discharged through the material outlet and enter the collecting apparatus 20, and the collecting apparatus 20 can separate the material from the gas. In some embodiments, the collecting apparatus 20 may be called a secondary tower by technicians.

The air feed apparatus 30 is a member connected to the air inlet of the drying chamber 10 and can feed gas into the drying chamber 10. In some embodiments, referring to FIG. 2, the air feed apparatus 30 may further include a first fan 33 and a first pipe 37. The first fan 33, the first condensing mechanism 31, and the first heating mechanism 32 are connected via the first pipe 37. The first fan 33 can pump external gas into the drying chamber 10. The gas, after treated by the first condensing mechanism 31 and the first heating mechanism 32, enters the drying chamber 10 and interacts with the material in the drying chamber 10 to dry the material.

"Along an air feed direction x of the air feed apparatus 30, the first condensing mechanism 31 is located upstream of the first heating mechanism 32" can mean that the gas fed by the air feed apparatus 30 to the drying chamber 10 is first treated by the first condensing mechanism 31 and then treated by the first heating mechanism 32.

The function of the first condensing mechanism 31 may be condensing the gas to reduce the water content of the gas, so that the gas with a lower water content is treated by the first heating mechanism 32 before entering the drying chamber 10. In some embodiments, the first condensing mechanism 31 may be a cold dryer, a dehumidifier, or another device capable of reducing the water content of the gas.

The first heating mechanism 32 can heat the gas condensed by the first condensing mechanism 31, so that the gas with lower water content enters the drying chamber 10 at a specific temperature to dry the material. In some embodiments, the first heating mechanism 32 may be an electric heating mechanism, a natural-gas heating mechanism, or the like.

In some embodiments, the water content of the material dried by the drying system 100 may be less than or equal to 2%, less than or equal to 5%, or less than or equal to 10%, depending on specific requirements. The water content of the material is measured in mass percentage.

In some embodiments, the first water content sensor 34 is a component disposed between the first condensing mechanism 31 and the first heating mechanism 32, and can detect water content of gas discharged from the first condensing mechanism 31 and generate a water content signal. In some embodiments, the water content signal can be displayed to an operator through a human-machine interaction module, such as a display screen.

In the foregoing solution, the air feed apparatus 30 includes a first condensing mechanism 31 and a first heating mechanism 32. The first condensing mechanism 31 condenses the gas to reduce its water content, and then the first heating mechanism 32 raises the temperature of the condensed gas, so that the high-temperature gas with low water content enters the drying chamber 10 to effectively dry the material. On the one hand, the first condensing mechanism 31 is disposed to meet the drying requirement of the material, resulting in a lower water content and improved quality of the material. On the other hand, the drying effect of the material is enhanced by reducing the water content of the gas entering the drying chamber 10. As compared to increasing the drying temperature, this approach effectively reduces the risk of compromising the quality of the material due to changes in its physical properties caused by high temperatures. In addition, the first water content sensor 34 is disposed between the first condensing mechanism 31 and the first heating mechanism 32 to detect the water content of the gas discharged from the first condensing mechanism 31 and generate a water content signal, so that the water content of the gas fed to the drying chamber 10 by the air feed apparatus 30 can be known, allowing the operator or the control apparatus 40 to regulate the power of the first condensing mechanism 31 based on the water content signal. On the one hand, if the water content is excessively high, that is, does not meet the requirement, the power of the first condensing mechanism 31 can be increased to achieve the desired water content. On the other hand, if the water content is excessively low, the power of the first condensing mechanism 31 can be reduced to save energy and control costs. In some embodiments, the material may be an adhesive used in batteries, and the adhesive may be a material that bonds the active substance layer and the current collector together. Therefore, using the drying system 100 provided in some embodiments of this application to dry the adhesive allows the water content of the adhesive to meet the requirement, that is, allowing the adhesive to have good quality, thereby improving connection stability between the active substance layer and the current collector and achieving high reliability of the battery.

According to some embodiments of this application, referring to FIG. 1, the drying system 100 further includes a control apparatus 40, where the control apparatus 40 is connected to the first water content sensor 34 and the first condensing mechanism 31. The control apparatus 40 is configured to receive the water content signal and control the power of the first condensing mechanism 31 based on the water content signal such that the water content P of the gas discharged by the first condensing mechanism 31 satisfies $P \le 10\ mg/m^3$.

In some embodiments, the control apparatus 40 may be a programmable logic controller (Programmable Logic Controller, PLC), which is capable of storing instructions for performing operations such as logic operations, sequential control, timing, counting, and arithmetic operations. The control apparatus 40 is connected to the first water content sensor 34 and the first condensing mechanism 31, so as to receive the water content signal and control the power of the first condensing mechanism 31 based on the water content signal. The water content of the gas discharged by the first condensing mechanism 31 can be regulated by regulating the power of the first condensing mechanism 31. Through control of the control apparatus 40, the water content P of the gas discharged from the first condensing mechanism 31 does not exceed 10 $mg/m^3$. This ensures that the gas discharged from the first condensing mechanism 31 is dry and meets the requirement for drying the material.

In the foregoing solution, the control apparatus 40 is disposed to automatically control the power of the first condensing mechanism 31 based on the water content signal such that the water content P of the gas discharged by the first condensing mechanism 31 satisfies $P \le 10\ mg/m^3$. This allows the material in the drying chamber 10 to be dried by the gas with lower water content, leading to good drying effect on the material and improved quality of the material, thus achieving high reliability of the battery.

In some other embodiments, the control apparatus 40 may alternatively not be disposed, and the operator can manually regulate the power of the first condensing mechanism 31 based on the water content signal displayed on the human-computer interaction module (for example, the first condensing mechanism 31 has multiple power settings, and the power can be changed by switching between these settings).

According to some embodiments of this application, an air feed rate of the air feed apparatus 30 is M1, satisfying $10000\ m^3/h \le M1 \le 60000\ m^3/h$.

In some embodiments, the air feed rate M1 refers to the flow of gas fed by the air feed apparatus 30 into the drying chamber 10. In some embodiments, specifications of the first fan 33 can be modified to adjust the size of the air feed rate M1, or the power of the first fan 33 can be regulated to adjust the size of the air feed rate M1.

In some embodiments, when an adhesive weighing from 500 kg to 3000 kg that needs to be dried is under treatment, the air feed rate M1 of the air feed apparatus 30 can satisfy $10000\ m^3/h \le M1 \le 60000\ m^3/h$, meaning that M1 can be 10000 $m^3/h$, 15000 $m^3/h$, 20000 $m^3/h$, 25000 $m^3/h$, . . . , 55000 $m^3/h$, or 60000 $m^3/h$.

In some other embodiments, the air feed rate of the air feed apparatus 30 is M1, further satisfying $20000\ m^3/h \le M1 \le 50000\ m^3/h$. In some other embodiments, the air feed rate of the air feed apparatus 30 is M1, further satisfying $30000\ m^3/h \le M1 \le 40000\ m^3/h$.

In the foregoing solution, in some embodiments, if the air feed rate of the air feed apparatus 30 is excessively low, the drying effect on the material becomes poor; and if the air feed rate of the air feed apparatus 30 is excessively high, more energy is required for air feed, resulting in higher costs. To address this, in these embodiments, the air feed rate M1 of the air feed apparatus 30 is limited to 10000 $m^3/h$ to 60000 $m^3/h$. On the one hand, this limitation can enhance the drying effect on the material and improve its quality, thus improving reliability of the battery. On the other hand, controlling the air feed rate M1 to not exceed 60000 $m^3/h$ can control energy consumption of the air feed apparatus 30, thereby effectively controlling costs.

In some other embodiments, the specific value of the air feed rate M1 is not restricted, and it can be less than 10000 $m^3/h$ or greater than 60000 $m^3/h$, depending on the requirements.

According to some embodiments of this application, as shown in FIG. 2, the air feed apparatus 30 further includes a first filter 35 and a second filter 36. Along an air feed direction x, the first filter 35 is located upstream of the first condensing mechanism 31, and the second filter 36 is located downstream of the first heating mechanism 32 and located between the air inlet of the drying chamber 10 and the first heating mechanism 32.

In some embodiments, the first filter 35 may be a primary or medium efficiency filter. In some embodiments, the first filter 35 may be made of an artificial fiber filter material, capable of filtering out large-particle dust impurities in the gas. The second filter 36 may be a high efficiency filter. In some embodiments, the second filter 36 may use ultra-fine glass fiber paper as the filter material. The second filter 36 can filter out small-particle dust or suspended matter. The second filter 36 has a stronger filter effect than the first filter 35, allowing it to filter smaller impurities or contaminants.

In some embodiments, before passing through the first condensing mechanism 31, the gas is filtered by the first filter 35 to reduce the risk of the first condensing mechanism 31 being affected by impurities or contaminants in the gas, so as to prolong service life of the first condensing mechanism 31. In some embodiments, after heated by the first heating mechanism 32 and before entering the drying chamber 10, the gas is filtered by the second filter, so as to reduce the risk of impurities or contaminants in the gas affecting the drying process of the material in the drying chamber 10, thus improving the drying effect and quality of the material.

In the foregoing solution, the first filter 35 is disposed upstream of the first condensing mechanism 31 to effectively filter out the impurities in the gas, thus reducing the effect of the impurities in the gas on the first condensing mechanism 31 and the first heating mechanism 32, and prolonging the service life of the first condensing mechanism 31 and the first heating mechanism 32. The second filter 36 is disposed between the drying chamber 10 and the first heating mechanism 32 to further reduce the impurities in the gas, so as to reduce the effect of the impurities on the material. This allows the material in good quality, thus achieving high quality of the battery.

Figure 3:
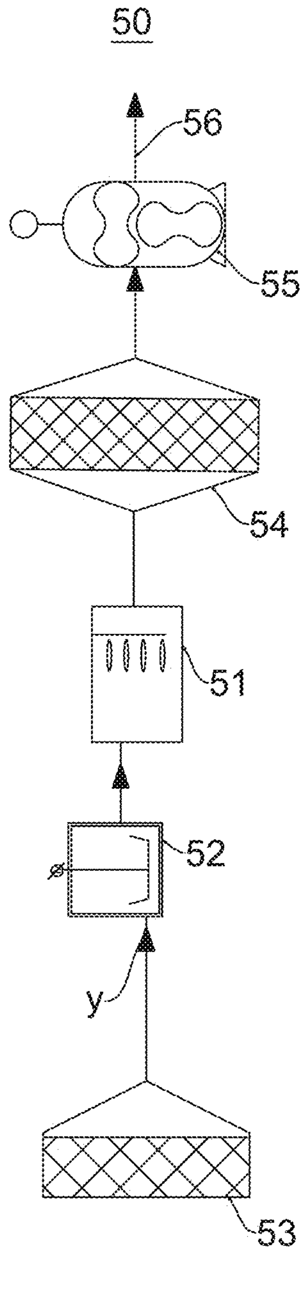
FIG. 3 is a schematic diagram of an air compensation apparatus according to some embodiment of this application.

According to some embodiments of this application, refer to FIG. 1 and FIG. 3. FIG. 3 is a schematic diagram of an air compensation apparatus 50 according to some embodiments of this application.

The drying system 100 further includes the air compensation apparatus 50, and the air compensation apparatus 50 is disposed between the drying chamber 10 and the collecting apparatus 20 and is configured to supply air to the collecting apparatus 20.

The air compensation apparatus 50 is a device for supplying air to the collecting apparatus 20, and is capable of providing gas to the material entering the collecting apparatus 20, allowing the material to be dried by the gas in the collecting apparatus 20.

In some embodiments, the material outlet of the drying chamber 10 and the material inlet of the collecting apparatus 20 are connected via a second pipe 11, and the second pipe 11 is provided with a branch pipe, where the branch pipe is connected to the air compensation apparatus 50. The air compensation apparatus 50 operates to supply air to the collecting apparatus 20 through the second pipe 11. The air compensation apparatus 50 is disposed between the drying chamber 10 and the collecting apparatus 20 to supply air to the collecting apparatus 20, reducing the risk of air pressure disturbances inside the collecting apparatus 20.

Referring to FIG. 3, the air compensation apparatus 50 may include a second fan 55, and the second fan 55 is connected to the collecting apparatus 20 via a third pipe 56. The second fan 55 can be a Roots fan.

In the foregoing solution, the air compensation apparatus 50 is disposed to supply air to the collecting apparatus 20, facilitating use of the gas supplied by the air compensation apparatus 50 for re-drying the material. This ensures that the water content of the material meets the requirement, and improves quality of the material, thus achieving high reliability of the battery.

In some other embodiments, the air compensation apparatus 50 may be directly connected to the collecting apparatus 20 to directly supply air to the collecting apparatus 20.

According to some embodiments of this application, an air supply rate of the air compensation apparatus 50 is M2, satisfying 5000 $m^3/h \leq M2 \leq 20000$ $m^3/h$.

In some embodiments, the air supply rate M2 may be the flow of the gas feed by the air compensation apparatus 50 into the collecting apparatus 20. In some embodiments, specifications of the second fan 55 can be modified to adjust the value of the air supply rate M2, or the power of the second fan 55 can be regulated to adjust the value of the air supply rate M2.

In some embodiments, when an adhesive weighing from 500 kg to 3000 kg that needs to be dried is under treatment, the air supply rate M2 can satisfy 5000 $m^3/h \leq M2 \leq 20000$ $m^3/h$, meaning that M2 can be 5000 $m^3/h$, 6000 $m^3/h$, 7000 $m^3/h$, 8000 $m^3/h$, . . . , 19000 $m^3/h$, or 20000 $m^3/h$.

In some other embodiments, the air supply rate M2 of the air compensation apparatus 50 may further satisfy 6000 $m^3/h \leq M2 \leq 15000$ $m^3/h$. In some other embodiments, the air supply rate M2 of the air compensation apparatus 50 may further satisfy 8000 $m^3/h \leq M2 \leq 10000$ $m^3/h$.

In the foregoing solution, in some embodiments, if the air supply rate of the air compensation apparatus 50 is excessively low, the drying effect on the material becomes poor; and if the air supply rate of the air compensation apparatus 50 is excessively high, more energy is required for air supply, resulting in higher costs. To address this, in these embodiments, the air supply rate M2 of the air compensation apparatus 50 is limited to 5000 $m^3/h$ to 20000 $m^3/h$. On the one hand, this limitation can enhance the drying effect on the material and improve its quality, thus improving reliability of the battery. On the other hand, the air supply rate M2 being controlled not beyond 20000 $m^3/h$, energy consumption of the air compensation apparatus 50 can be controlled, thereby effectively controlling costs.

According to some embodiments of this application, the air compensation apparatus 50 includes a second heating mechanism 51, where the second heating mechanism 51 is configured to heat gas supplied to the collecting apparatus 20.

The second heating mechanism 51 can be a mechanism for heating the gas supplied to the collecting apparatus 20 so that the gas enters the collecting apparatus 20 at a specific temperature to dry the material. In some embodiments, the second heating mechanism 51 may be an electric heating mechanism, a natural-gas heating mechanism, or the like.

In the foregoing solution, the second heating mechanism 51 is disposed, making it possible for the gas with a certain amount of heat to dry the material in the collecting apparatus 20. This can improve the drying effect on the material and enhance the quality of the material, thus improving the reliability of the battery.

According to some embodiments of this application, the drying system 100 further includes a first temperature sensor (not shown in the figure). The first temperature sensor is disposed in the drying chamber 10 and is configured to detect the temperature in the drying chamber 10 and generate a temperature signal.

The first temperature sensor is a component capable of detecting temperature. In some embodiments, the first temperature sensor may be disposed inside the drying chamber 10, for example, in the middle of the drying chamber 10 or at the material outlet of the drying chamber 10.

In the process of drying the material, the temperature cannot be excessively high or low. If the temperature is excessively high, there is a risk of affecting properties of the material, for example, causing the material adhesion or swelling. If the temperature is excessively low, the drying effect is compromised. Therefore, in the foregoing solution, the first temperature sensor is disposed to detect the current temperature in the drying chamber 10 and generate a temperature signal, so that the temperature of the material can be timely known and the power of the second heating mechanism 51 can be regulated based on the requirements, preventing the temperature from being excessively high or low. This ensures good drying effect on the material, thus improving reliability of the battery.

According to some embodiments of this application, as shown in FIG. 1, the drying system 100 further includes a control apparatus 40. The control apparatus 40 is connected to the first temperature sensor and the second heating mechanism 51. The control apparatus 40 is configured to receive the temperature signal and control the power of the second heating mechanism 51 based on the temperature signal such that the heating temperature T of the gas heated by the second heating mechanism 51 satisfies 40° C.≤T≤60° C.

In some embodiments, the control apparatus 40 may be a programmable logic controller (Programmable Logic Controller. PLC), which is capable of storing instructions for performing operations such as logic operations, sequential control, timing, counting, and arithmetic operations. The control apparatus 40 is connected to the first temperature sensor and the second heating mechanism 51, and controls the power of the second heating mechanism 51 based on the received temperature signal. The second heating mechanism 51, under the control of the control apparatus, can heat the gas at a heating temperature T of 40° C., 41° C., 42° C., . . . , 57° C., 58° C., 59° C., or 60° C.

In some embodiments, the control apparatus 40 receives the temperature signal and controls the power of the second heating mechanism 51 based on the temperature signal such that the heating temperature T of the gas heated by the second heating mechanism 51 satisfies 30° C.≤T≤60° C. or satisfies 40° C.≤T≤55° C.

In the foregoing solution, if a heating temperature of the second heating mechanism 51 with respect to the gas is excessively low, poor drying effect and condensation may be caused, leading to material adhesion to the pipe. If the heating temperature is excessively high, the physical properties of the material are affected. To address this, the control apparatus 40 is disposed to automatically control the power of the second heating mechanism 51 based on the temperature signal such that the heating temperature T of the gas heated by the second heating mechanism 51 satisfies 40° C.≤T≤60° C., thereby facilitating drying of the material within an appropriate temperature range.

According to some embodiments of this application, as shown in FIG. 3, the air compensation apparatus 50 includes a second condensing mechanism 52, and along an air supply direction y of the air compensation apparatus 50, the second condensing mechanism 52 is located upstream of the second heating mechanism 51. The second condensing mechanism 52 is configured to reduce the water content of the gas supplied to the collecting apparatus 20.

The function of the second condensing mechanism 52 may be condensing the gas to reduce its water content, so that the gas with a lower water content is treated by the second heating mechanism 51 before entering the collecting apparatus 20. In some embodiments, the second condensing mechanism 52 may be a cold dryer, a dehumidifier, or another device capable of reducing the water content of the gas.

In the foregoing solution, the second condensing mechanism 52 is disposed to reduce the water content of the gas supplied to the collecting apparatus 20, leading to good drying effect on the material and improved quality of the material, thus achieving high reliability of the battery.

According to some embodiments of this application, as shown in FIG. 3, the air compensation apparatus 50 further includes a third filter 53 and a fourth filter 54. Along the air supply direction y, the third filter 53 is located upstream of the second condensing mechanism 52, and the fourth filter 54 is located downstream of the second heating mechanism 51 and located between the collecting apparatus 20 and the second heating mechanism 51.

In some embodiments, the third filter 53 may be a primary or medium efficiency filter. In some embodiments, the third filter 53 may be made of an artificial fiber filter material, capable of filtering out large-particle dust impurities in the gas. The fourth filter 54 may be a high efficiency filter. In some embodiments, the fourth filter 54 may use ultra-fine glass fiber paper as the filter material. The fourth filter 54 can filter out small-particle dust or suspended matter. The fourth filter 54 has a stronger filtration effect than the third filter 53, allowing it to filter out smaller impurities or contaminants.

In some embodiments, before passing through the second condensing mechanism 52, the gas is filtered by the third filter 53 to reduce the risk of the second condensing mechanism 52 being affected by impurities or contaminants in the gas, thus prolonging service life of the second condensing mechanism 52. In some embodiments, after heated by the second heating mechanism 51 and before entering the collecting apparatus 20, the gas is filtered by the fourth filter 54, so as to reduce the risk of impurities or contaminants in the gas affecting the drying process of the material in the collecting apparatus 20, thus improving the drying effect and quality of the material.

In the foregoing solution, the third filter 53 is disposed upstream of the second condensing mechanism 52 to effectively filter out the impurities in the gas, thus reducing the effect of the impurities in the gas on the second condensing mechanism 52 and the second heating mechanism 51, and prolonging the service life of the second condensing mechanism 52 and the second heating mechanism 51. The fourth filter 54 is disposed between the collecting apparatus 20 and the second heating mechanism 51 to further reduce the impurities in the gas, so as to reduce the effect of the impurities on the material. This allows the material in good quality, thus achieving high quality of the battery.

According to some embodiments of this application, referring to FIG. 1, the drying system 100 further includes a material conveying apparatus 60. The material conveying apparatus 60 is connected to the material inlet of the drying chamber 10 to provide the material to be dried to the drying chamber 10.

The material conveying apparatus 60 may be a component for conveying a material to the drying chamber 10. In some embodiments, the material conveying apparatus 60 may include a fourth pipe 61 and a conveying pump 62, where the material is conveyed through the fourth pipe 61 to the material inlet of the drying chamber 10, and the conveying pump 62 provides power for conveying the material. A valve may be provided on the fourth pipe 61 to allow or cut off the conveying of the material.

In the foregoing solution, the material conveying apparatus 60 is disposed to supply a material to the drying chamber 10, implementing automation of the drying system 100. This not only reduces labor costs but also improves drying efficiency.

According to some embodiments of this application, referring to FIG. 1, a nozzle 70 is disposed in the drying chamber 10, and the nozzle 70 is connected to the material inlet of the drying chamber 10.

The nozzle 70 is a component located in the drying chamber 10 and connected to the material inlet of the drying chamber 10. The nozzle 70 may be an atomizing nozzle, allowing the material to be sprayed as mist or small particles after passing through the nozzle 70.

In some embodiments, after being subjected to the nozzle 70, the material may enter the drying chamber 10 in the form of mist or small particles, allowing the material to fully contact with the gas fed by the air feed apparatus 30, which has low water content and a specific temperature.

In some embodiments, a high pressure pipe 63 is disposed on the fourth pipe 61 to enhance efficiency of material passing through the nozzle 70. The high-pressure gas acts on the material, making the material pass through the nozzle 70 at a relatively high velocity.

In the foregoing solution, when the material enters the drying chamber 10 through the material inlet, the material can be atomized under the action of the nozzle 70. This increases the contact area between the material and the high-temperature gas, thereby improving the drying efficiency.

According to some embodiments of this application, the collecting apparatus 20 includes a cyclone collector 21 and/or a baghouse collector 22.

In some embodiments, the collecting apparatus 20 may be a cyclone collector 21, or a baghouse collector 22, or a cyclone collector 21 and a baghouse collector 22 connected in series.

In some embodiments, the cyclone collector 21 is also called a cyclone dust collector by technicians, a type of dust removal apparatus. Gas containing the material undergoes rotational motion inside the cyclone collector 21. With assistance of a centrifugal force, the material is separated from the gas flow and accumulated on an inner wall of the collector, and then under the force of gravity, the material falls into a collecting chamber of the cyclone collector 21.

In some embodiments, the baghouse collector 22 is also called a baghouse dust collector by technicians, a type of dust removal apparatus. A filter bag of the baghouse collector 22 is made of textile filter cloth or non-textile felt. The filter bag utilizes the filtering action of the fiber fabric to filter the gas containing the material. When the gas containing the material enters the baghouse collector 22, the material sediments due to the force of gravity and falls into a collecting chamber of the baghouse collector 22.

Referring to FIG. 1, the material outlet of the drying chamber 10 is connected to the cyclone collector 21, and the cyclone collector 21 is connected to the baghouse collector 22. The baghouse collector 22 is connected to a draft fan 23. The draft fan 23 functions to create a slight negative pressure inside the baghouse collector 22 and the cyclone collector 21, facilitating better collection of the material.

In the foregoing solution, the collecting apparatus 20 includes a cyclone collector 21 and/or a baghouse collector 22, which can effectively separate the gas from the material, thereby improving the collecting efficiency of the material.

According to some embodiments of this application, referring to FIG. 1 to FIG. 3, a drying system 100 is provided. The drying system 100 includes a drying chamber 10, a collecting apparatus 20, an air feed apparatus 30, and an air compensation apparatus 50. In this drying system 100, there are two important factors for improving the drying effect on materials: firstly, the first condensing mechanism 31 is provided to condense the gas entering the drying chamber 10, so as to reduce the water content of the gas entering the drying chamber 10; secondly, the air compensation apparatus 50 is disposed between the drying chamber 10 and the collecting apparatus 20 to feed dried gas into the collecting apparatus 20 to lower the water content of the material.

Referring to FIG. 2, the air feed apparatus 30 includes the first filter 35, the first fan 33, the first condensing mechanism 31, the first heating mechanism 32, and the second filter 36. The first filter 35, the first fan 33, the first condensing mechanism 31, the first heating mechanism 32, and the second filter 36 are connected via the first pipe 37, and the second filter 36 is connected to the air inlet of the drying chamber 10.

Referring to FIG. 1, the material outlet of the drying chamber 10 is connected to the collecting apparatus 20 via the second pipe 11. The collecting apparatus 20 includes the cyclone collector 21 and the baghouse collector 22 connected in series, and the baghouse collector 22 is connected to the draft fan 23.

Referring to FIG. 3, the air compensation apparatus 50 includes a third filter 53, a second condensing mechanism 52, a second heating mechanism 51, a fourth filter 54, and a second fan 55. The third filter 53, the second condensing mechanism 52, the second heating mechanism 51, the fourth filter 54, and the second fan 55 are connected via the third pipe 56, and the second fan 55 is connected to the second pipe 11 to provide gas for the collecting apparatus 20.

The foregoing are only preferred embodiments of this application and are not intended to limit the present application. For persons skilled in the art, this application may be subject to various modifications and changes. Any modifications, equivalent replacements, and improvements made without departing from the spirit and principle of this application shall fall within the protection scope of this application.

The foregoing are only preferred embodiments of this application and are not intended to limit the present application. For persons skilled in the art, this application may be subject to various modifications and changes. Any modifications, equivalent replacements, and improvements made without departing from the spirit and principle of this application shall fall within the protection scope of this application.

The invention claimed is:

1. A drying system, comprising:

a drying chamber configured to accommodate a material to be dried;

a collecting apparatus connected to a material outlet of the drying chamber; and an air feed apparatus connected to an air inlet of the drying chamber and configured to feed air to the drying chamber, wherein the air feed apparatus comprises a first condensing mechanism, a first heating mechanism, and a first water content sensor, wherein along an air feed direction of the air feed apparatus, the first condensing mechanism is located upstream of the first heating mechanism; the first condensing mechanism is configured to reduce water content of gas entering the drying chamber; the first heating mechanism is configured to heat the gas entering the drying chamber; and the first water content sensor is disposed between the first condensing mechanism and the first heating mechanism and is configured to detect water content of gas discharged from the first condensing mechanism and generate a water content signal.

2. The drying system according to claim 1, wherein the drying system further comprises a control apparatus, wherein the control apparatus is connected to the first water content sensor and the first condensing mechanism, the control apparatus is configured to receive the water content signal and control power of the first condensing mechanism based on the water content signal such that the water content P of the gas discharged by the first condensing mechanism satisfies $P \leq 10\ mg/m^3$.

3. The drying system according to claim 1, wherein an air feed rate of the air feed apparatus is M1, satisfying $10000\ m^3/h \leq M1 \leq 60000\ m^3/h$.

4. The drying system according to claim 1, wherein the air feed apparatus further comprises a first filter and a second filter; and along the air feed direction, the first filter is located upstream of the first condensing mechanism, and the second filter is located downstream of the first heating mechanism and located between the air inlet of the drying chamber and the first heating mechanism.

5. The drying system according to claim 1, wherein the drying system further comprises an air compensation apparatus, wherein the air compensation apparatus is disposed between the drying chamber and the collecting apparatus and is configured to supply air to the collection collecting apparatus.

6. The drying system according to claim 5, wherein an air supply rate of the air compensation apparatus is M2, satisfying $5000\ m^3/h \leq M2 \leq 20000\ m^3/h$.

7. The drying system according to claim 5, wherein the air compensation apparatus comprises a second heating mechanism, wherein the second heating mechanism is configured to heat gas supplied to the collecting apparatus.

8. The drying system according to claim 7, wherein the drying system further comprises a first temperature sensor, wherein the first temperature sensor is disposed in the drying chamber and is configured to detect temperature in the drying chamber and generate a temperature signal.

9. The drying system according to claim 8, wherein the drying system further comprises a control apparatus, wherein the control apparatus is connected to the first temperature sensor and the second heating mechanism, and the control apparatus is configured to receive the temperature signal and control power of the second heating mechanism based on the temperature signal such that a heating temperature T of gas heated by the second heating mechanism satisfies $40°\ C. \leq T \leq 60°\ C.$

10. The drying system according to claim 7, wherein the air compensation apparatus comprises a second condensing mechanism, wherein along an air supply direction of the air compensation apparatus, the second condensing mechanism is located upstream of the second heating mechanism, and the second condensing mechanism is configured to reduce water content of gas supplied to the collecting apparatus.

11. The drying system according to claim 10, wherein the air compensation apparatus further comprises a third filter and a fourth filter; and along the air supply direction, the third filter is located upstream of the second condensing mechanism, and the fourth filter is located downstream of the second heating mechanism and located between the collecting apparatus and the second heating mechanism.

12. The drying system according to claim 1, wherein the drying system further comprises a material conveying apparatus, wherein the material conveying apparatus is connected to a material inlet of the drying chamber to provide the material to be dried to the drying chamber.

13. The drying system according to claim 12, wherein the drying chamber is provided with a nozzle inside, wherein the nozzle is connected to the material inlet of the drying chamber.

14. The drying system according to claim 1, wherein the collecting apparatus comprises a cyclone collector and/or a baghouse collector.

* * * * *